United States Patent
Kawana

(10) Patent No.: US 8,522,009 B2
(45) Date of Patent: Aug. 27, 2013

(54) DEVICE MANAGEMENT SYSTEM, SITE MONITORING APPARATUS AND METHOD

(75) Inventor: Yoshimasa Kawana, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 12/946,904

(22) Filed: Nov. 16, 2010

(65) Prior Publication Data
US 2011/0126004 A1    May 26, 2011

(30) Foreign Application Priority Data

Nov. 25, 2009   (JP) ................. 2009-267829
May 12, 2010   (JP) ................. 2010-110597

(51) Int. Cl.
*H04L 29/06*   (2006.01)

(52) U.S. Cl.
USPC ............................ 713/153; 713/156; 713/161

(58) Field of Classification Search
USPC .................................. 713/153, 155, 161
See application file for complete search history.

(56) References Cited

U.S. PATENT DOCUMENTS

| | | | |
|---|---|---|---|
| 6,092,196 A * | 7/2000 | Reiche | 726/6 |
| 7,797,533 B2 | 9/2010 | Murakawa | |
| 2002/0099952 A1 * | 7/2002 | Lambert et al. | 713/200 |
| 2004/0250129 A1 * | 12/2004 | Clough et al. | 713/201 |
| 2005/0005097 A1 | 1/2005 | Murakawa | |
| 2005/0021703 A1 * | 1/2005 | Cherry et al. | 709/223 |
| 2008/0028060 A1 * | 1/2008 | Fukasawa et al. | 709/223 |
| 2008/0062883 A1 | 3/2008 | Shima | |

FOREIGN PATENT DOCUMENTS

| | | |
|---|---|---|
| EP | 1729483 | 12/2006 |
| JP | 2008-228004 | 9/2008 |
| WO | 2006/009288 | 1/2006 |
| WO | 2006/092642 A1 | 9/2006 |

OTHER PUBLICATIONS

Official Communication issued by the European Patent Office on Dec. 19, 2011, in counterpart European Patent Application No. 11182477.7.
European Office Action/Search Report dated Mar. 15, 2011, issued in European Application No. 10192164.1.

* cited by examiner

*Primary Examiner* — Michael Simitoski
*Assistant Examiner* — Ali Shayanfar
(74) *Attorney, Agent, or Firm* — Fitzpatrick, Cella, Harper & Scinto

(57) ABSTRACT

A server certificate and root certificate for performing secure communication with monitoring target devices are issued in a site monitoring apparatus. Using a secret key that is paired with a public key, a digital signature is issued based on communication destination information in which the site monitoring apparatus is the communication destination and the issued root certificate, and the communication destination information, root certificate, and digital signature are transmitted to the monitoring target devices. The monitoring target devices receive the communication destination information, root certificate, and digital signature from the site monitoring apparatus. Authentication is performed on the received digital signature using the public key, and in accordance with successful authentication, the communication destination for device monitoring information is changed from a management server to the site monitoring apparatus and secure communication is performed with the site monitoring apparatus, using the received communication information and root certificate.

9 Claims, 10 Drawing Sheets

F I G. 4
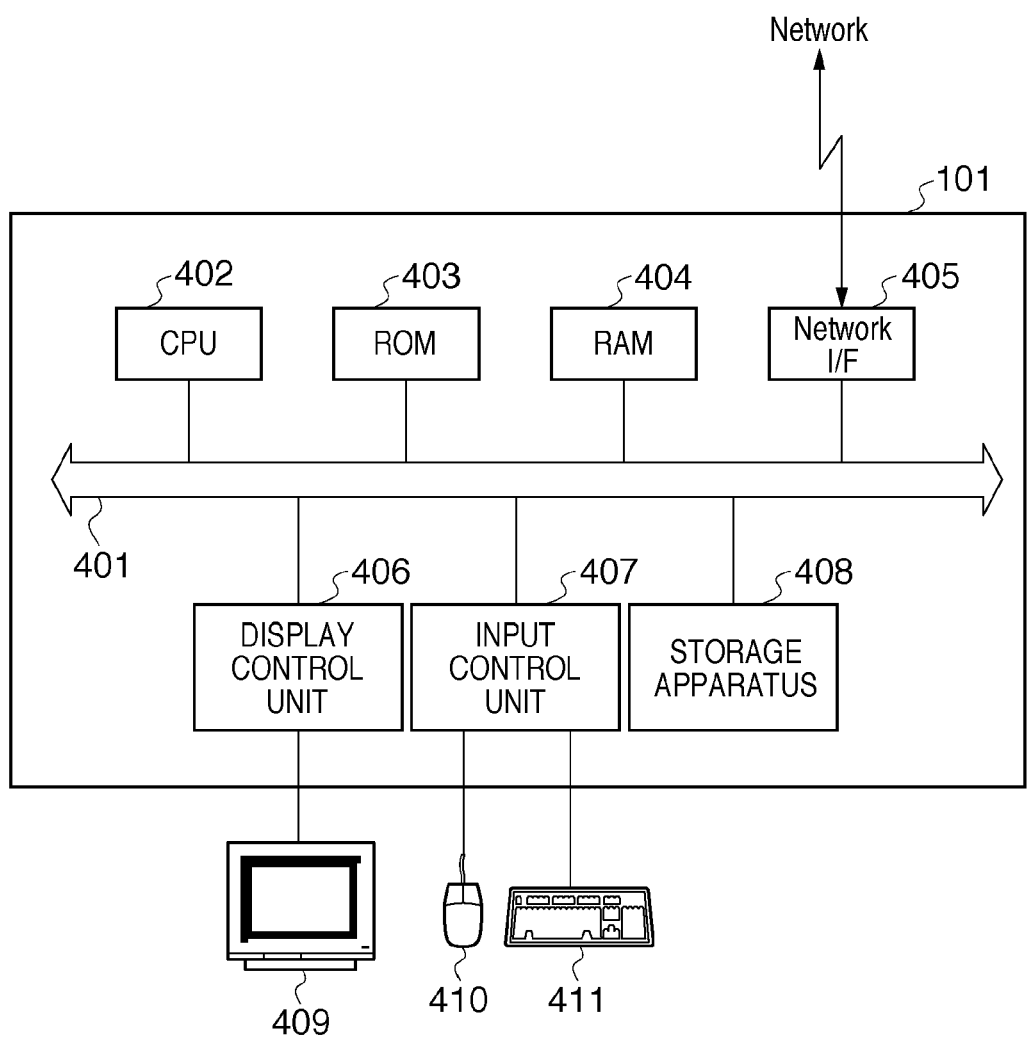

FIG. 7

| method : setComSetting | | |
|---|---|---|
| serialNumber | AAA01234 | ~702 |
| webServiceUrl | https://host/path | ~703 |
| processType | 0A001 | ~704 |
| enable | on | ~705 |
| certInfo | data01 | ~706 |
| signature | data02 | ~707 |

(701 labels the method row)

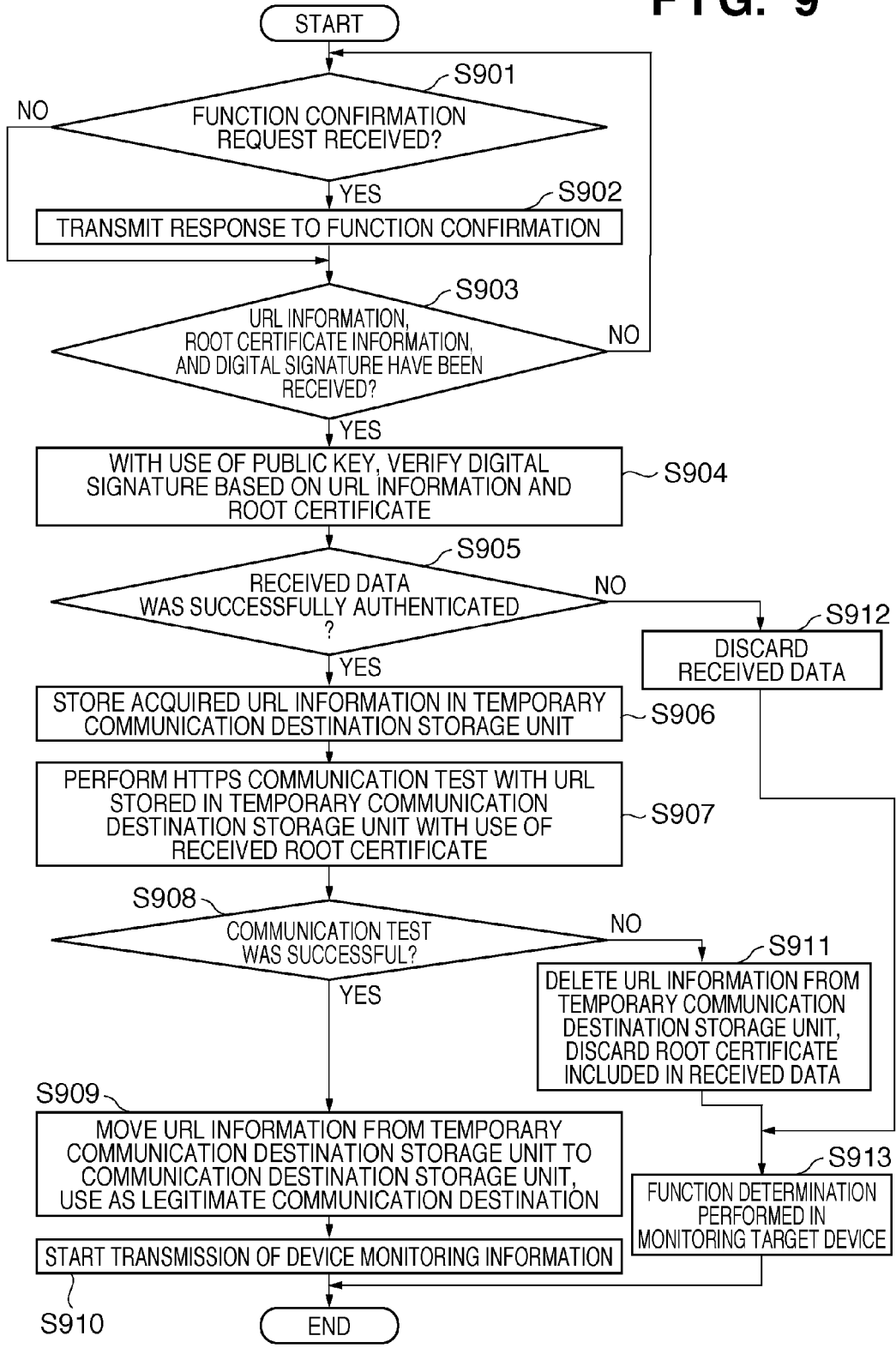

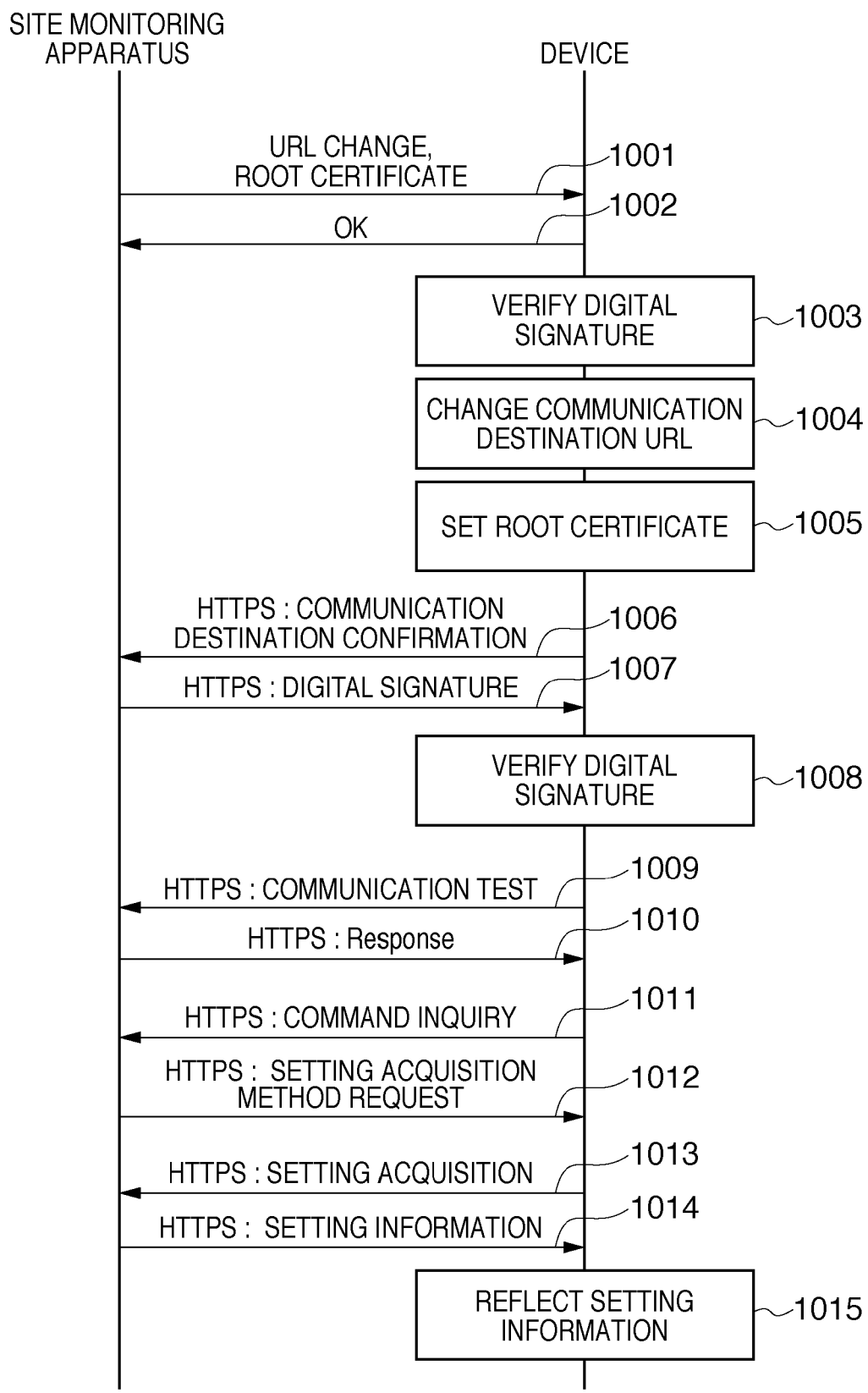

DEVICE MANAGEMENT SYSTEM, SITE MONITORING APPARATUS AND METHOD

BACKGROUND OF THE INVENTION

1. Field of the Invention

The present invention relates to a method in which the device monitoring information transmission destination of a device that can transmit device monitoring information to a management server is securely changed to a site monitoring apparatus, and communication is securely performed with the site monitoring apparatus.

2. Description of the Related Art

Conventionally, as one example of a method for providing a secure communication environment, there is a method that makes use of signed certificates (e.g., see Japanese Patent Laid-Open No. 2008-228004). In this technology, when secure communication is to be performed between a server and a client, security is ensured by using SSL. SSL communication requires the client device to use a certificate, and in order for a certificate to be securely set in the client device, the server prepares a signed certificate.

The server records a public key with which signature verification can be performed in an external medium, and the external medium is distributed to the client device. When the client device accesses the server via a network, the client device receives a prepared signed certificate from the server. The client device then determines that the server is a legitimate communication partner by verifying the certificate with use of the public key, and starts SSL communication with use of the acquired certificate that has been verified.

However, with the conventional technology described above, the range of communication partners is limited due to the fact that the public key is distributed via the external medium on which it has been recorded by the server. Accordingly, there is the problem that client devices that can communicate with the server are limited to those to which the external medium can be distributed.

Also, in a device monitoring system, the server provides services within the client network, and therefore transmission destination URL information is not originally specified. For this reason, there is the problem that the client does not know where to transmit device monitoring information until the server has been installed.

SUMMARY OF THE INVENTION

The present invention provides an apparatus and a method for providing a secure communication environment in which public key information is not distributed via an external medium regardless of where a monitoring apparatus is installed in a client network, thereby enabling securely changing a communication destination address, and performing device monitoring in a secure communication environment.

According to one aspect of the present invention, there is provided a device management system including a site monitoring apparatus that communicates with a management server via an internet, and a plurality of monitoring target devices that are to be connected to the site monitoring apparatus, wherein the site monitoring apparatus comprises: a holding unit that holds a secret key that is paired with a public key held by each of the monitoring target devices; an issue unit that issues, within the site monitoring apparatus, a server certificate and a root certificate that are for performing secure communication with each of the monitoring target devices; a signature unit that issues, with use of the secret key, a digital signature based on communication destination information in which the site monitoring apparatus is a communication destination and the root certificate issued by the issue unit; and a transmission unit that transmits the communication destination information, the root certificate issued by the issue unit, and the digital signature issued by the signature unit to each of the monitoring target devices, and wherein each of the monitoring target devices comprises: a holding unit that holds the public key paired with the secret key held by the site monitoring apparatus; a reception unit that receives the communication destination information, the root certificate, and the digital signature from the site monitoring apparatus; an authentication unit that performs authentication on the digital signature received by the reception unit with use of the public key; and a communication unit that, in the case of successful authentication performed by the authentication unit, changes a communication destination for device monitoring information from the management server to the site monitoring apparatus and performs secure communication with the site monitoring apparatus, with use of the communication destination information and the root certificate received by the reception unit.

According to another aspect of the present invention, there is provided a site monitoring apparatus that communicates with a management server via an internet and is configured to be connected to a plurality of monitoring target devices, comprising: a holding unit that holds a secret key that is paired with a public key held by each of the monitoring target devices; an issue unit that issues, within the site monitoring apparatus, a server certificate and a root certificate that are for performing secure communication with each of the monitoring target devices; a signature unit that issues, with use of the secret key, a digital signature based on communication destination information in which the site monitoring apparatus is a communication destination and the root certificate issued by the issue unit; a transmission unit that transmits the communication destination information, the root certificate issued by the issue unit, and the digital signature issued by the signature unit to each of the monitoring target devices; and a communication unit that, for each of the monitoring target devices, performs secure communication with the monitoring target device depending on a communication test performed by the monitoring target device with use of the communication destination information and the root certificate in the case of successful authentication of the digital signature performed with use of the public key held by the monitoring target device, wherein device monitoring information is acquired from a monitoring target device with use of the communication performed by the communication unit.

Further features of the present invention will become apparent from the following description of exemplary embodiments with reference to the attached drawings.

BRIEF DESCRIPTION OF THE DRAWINGS

FIG. 4 is a block diagram showing a hardware configuration of the site monitoring apparatus.

FIG. 7 is a diagram schematically showing communication data by which the site monitoring apparatus sends a root certificate for communication and an instruction for changing communication destination information.

FIG. 9 is a flowchart showing processing performed by a device from receiving a function confirmation request to transmitting its device monitoring information.

FIG. 10 is a diagram schematically showing a sequence of communication and internal processing from when the site monitoring apparatus sends a root certificate and an instruction for changing communication destination information until when a device enters a monitored state.

DESCRIPTION OF THE EMBODIMENTS

Below is a detailed description of an embodiment for carrying out the present invention with reference to the drawings.

Example of Configuration of Device Management System

Figure 1:
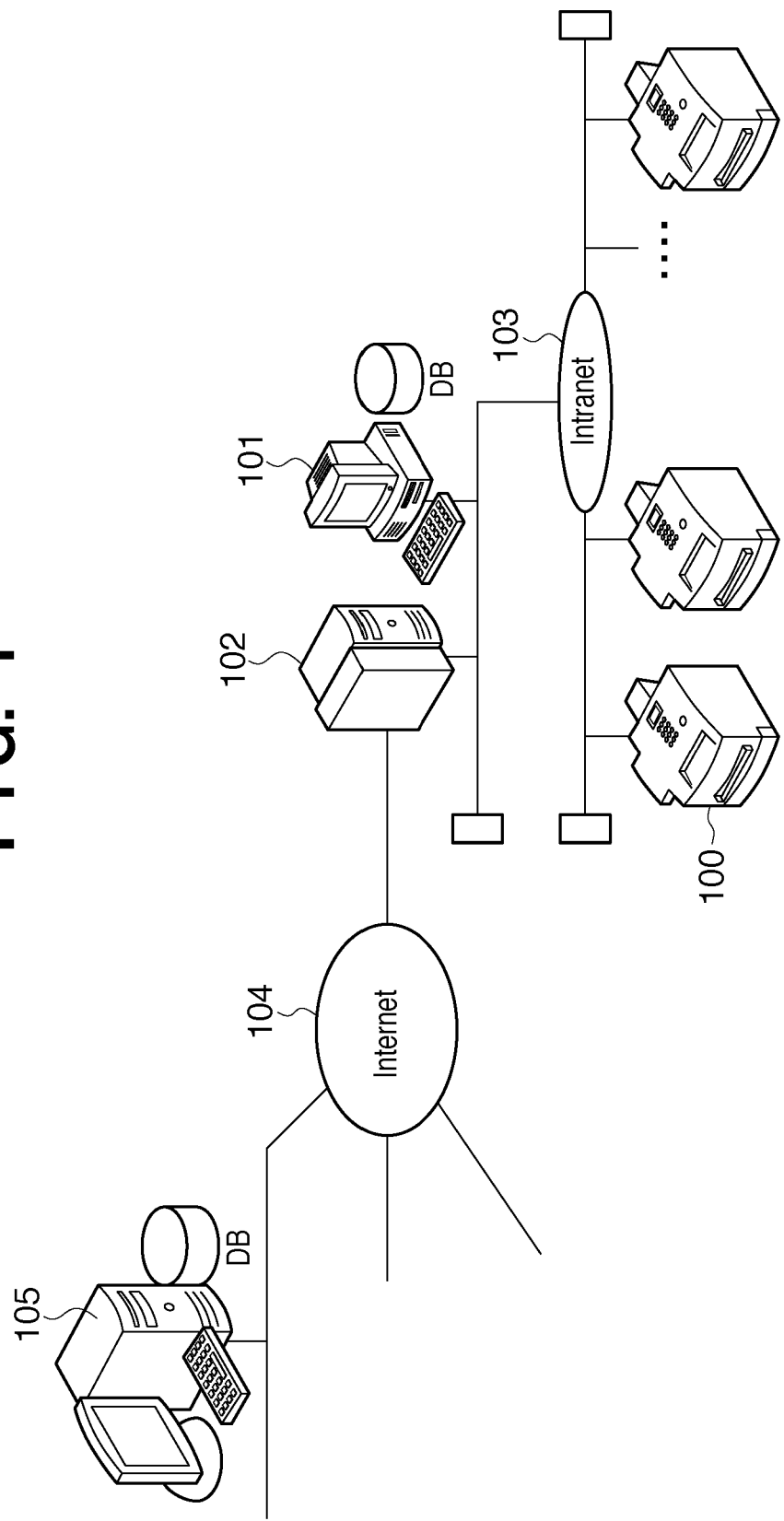
FIG. 1 is a diagram showing connections between a copier, a site monitoring apparatus, and a management server in a network according to an embodiment of the present invention.

FIG. 1 is a diagram showing connections between a copier, a site monitoring apparatus, and a management server in a network. Examples of devices targeted for management that are connected to an intranet 103, which is a consumer in-house network, include image processing apparatuses such as single function peripherals (SFPs) and multifunction peripherals (MFPs) that have functions such as printing and copying. Note that in the following description, the devices connected by the network or the like will collectively be referred to as a "device 100".

A site monitoring apparatus 101 for monitoring the device 100 is also connected to the intranet 103. A firewall 102 is furthermore provided as a connection point with an Internet 104. This firewall 102 prevents unauthorized network access to the intranet 103 from the outside.

The device 100 has a function of monitoring itself and can transmit device monitoring information such as device counter information and an alarm to a monitoring device on an external network. Note that as initial settings, the device is set so as to transmit the device monitoring information to a web service of a management server 105 on the Internet 104. Network environment information such as a proxy server is set in the device when it is connected to the intranet 103, thus enabling the device to transmit its device monitoring information to the management server 105.

Here, the present invention enables the device 100 to change the transmission destination of the device monitoring information to another device. The transmission destination of the device monitoring information can be changed by receiving URI change information from a trusted device. This function enables the device 100 to transmit the device monitoring information to the site monitoring apparatus 101.

Also, similarly to instructing a change to a communication destination URI, instructing the setting of a root certificate in the device 100 enables performing secure communication with the site monitoring apparatus 101 through HTTPS.

Note that although the site monitoring apparatus 101 is illustrated as a general personal computer (PC), any device capable of executing a monitoring program may be used. Accordingly, a mode is possible in which the monitoring program is installed in and executed by, for example, dedicated hardware or a device other than a PC. In the present invention, there are no limitations on the mode of the site monitoring apparatus 101.

The site monitoring apparatus 101 requests and acquires, via the intranet 103, device monitoring information pertaining to the device 100, including various operating mode settings, a counter value, operation information such as an operation log, and trouble information indicating hardware trouble, jamming, or the like. The site monitoring apparatus 101 can also provide a web service or a service using an original protocol, and collect information by receiving device monitoring information that has been voluntarily transmitted from devices.

On the other hand, the management server 105 collects and manages device information by communicating, via the Internet 104, with the site monitoring apparatus 101 provided on the intranet 103. The site monitoring apparatus 101 periodically transmits a collection of collected device monitoring information to the management server 105 on the Internet 104. There are also cases where some of the trouble information is transmitted out of synchronization with the periodic communication. The management server 105 includes functions for providing services based on the collected information, such as displaying an accounting counter report, notifying trouble events in order for a service person to maintain devices, calculating the extent of wearing of device parts, managing toner stock, and arranging delivery of toner.

A countless number of other consumer networks similar to the intranet 103 are also connected to the Internet 104.

Example of Configuration of Device of Present Embodiment

Figure 2:
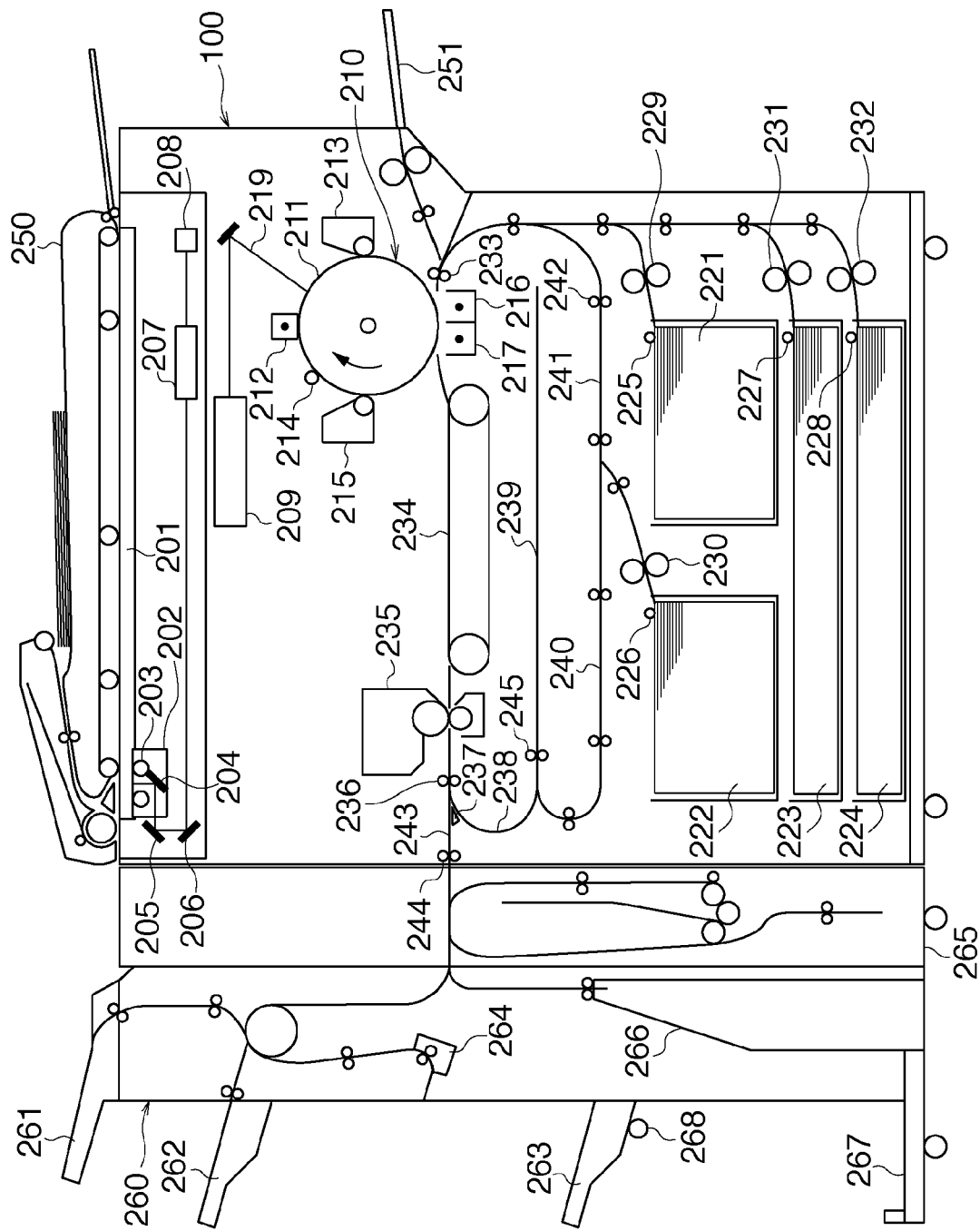
FIG. 2 is a cross-sectional diagram showing a configuration of a device according to the embodiment.

FIG. 2 is a cross-sectional diagram showing a configuration of the device according to the present embodiment. As shown in FIG. 2, the device 100 includes an automatic document feeder (DF) 250 and a scanner 202, and the scanner 202 is configured by an original illumination lamp 203, a scan mirror 204, and the like. The automatic document feeder 250 conveys originals one at a time onto a platen glass 201 in order beginning from the last page, and discharges each original after a reading operation performed thereon has ended. The original conveyed onto the platen glass 201 is scanned back and forth by the scanner 202, which is driven by a motor (not shown), and the reflected light is reflected by scan mirrors 204 to 206, passes through a lens 207, and forms an image on a CCD sensor inside an image sensor unit 208. The image sensor unit 208 converts the image into an electrical signal, predetermined image processing is performed thereon to obtain an image signal, and an exposure control unit 209 configured by a laser, a polygon scanner, and the like irradiates a photosensitive drum 211 with laser light 219 that has been modulated based on the image signal.

Mounted around the photosensitive drum 211 are a primary charging device 212, a developing device 213, a transfer charging device 216, a pre-exposure lamp 214, and a cleaning device 215. In an image forming unit 210, the photosensitive drum 211 is rotated in the arrow direction by a motor (not shown), then charged with a desired potential by the primary charging device 212, and thereafter irradiated with the laser light 219 by the exposure control unit 209, thus forming an electrostatic image on the photosensitive drum 211. The electrostatic image formed on the photosensitive drum 211 is then developed by the developing device 213 and visualized as a toner image.

A transfer sheet that has been supplied from a cassette deck 221 or 222, or an upper cassette 223 or a lower cassette 224 by a corresponding one of pickup rollers 225 to 228 is fed to a transfer belt 234 by a corresponding one of paper supply rollers 229 to 232 and a resist roller 233. In this process, the visualized toner image is transferred to the transfer sheet by the transfer charging device 216. A multifunction manual feeder 251 that can store 100 transfer sheets is also mounted.

After the transfer of the toner image, residual toner on the photosensitive drum 211 is cleaned by the cleaning device 215, and residual charge is eliminated by the pre-exposure lamp 214. The transfer sheet with the toner image transferred thereon is separated from the photosensitive drum 211 by a separation charging device 217, and conveyed to a fixing device 235 by the transfer belt 234. The fixing device 235 fixes the toner image by applying pressure and heat, and thereafter the transfer sheet is discharged out of the device 100 by a discharge roller 236.

A discharge flapper 237 switches the conveyance route between a conveyance path 238 and a discharge path 243. On a lower conveyance path 240, the transfer sheet supplied from the discharge roller 236 is inverted by an inversion path 239, and then led to a re-supply path 241. A transfer sheet that has been supplied from the left cassette deck 222 by the paper supply roller 230 and by the re-supply roller 242 that re-supplies the transfer sheet to the image forming unit 210 is also led to the re-supply path 241. A discharge roller 244 disposed in the vicinity of the discharge flapper 237 discharges the transfer sheet to the outside if the conveyance path has been switched to the discharge path 243 by the discharge flapper 237.

In the case of duplex recording (duplex copying), the discharge flapper 237 is raised upward, and the transfer sheet to which copying has been completed is led to the re-supply path 241 via the conveyance path 238, the inversion path 239, and the lower conveyance path 240. Here, the transfer sheet is pulled by the inversion roller 245 until the back edge of the transfer sheet is completely out of the conveyance path 238, then pulled into the inversion path 239 to a position where the back edge of the transfer sheet is clamped by the inversion roller 245, and then conveyed to the lower conveyance path 240 by reversing the rotation of the inversion roller 245.

In the case of discharging a transfer sheet from the device 100 in an inverted state, the discharge flapper 237 is raised upward, and the transfer sheet is pulled into the inversion path 239 by the inversion roller 245 to a position where the back edge of the transfer sheet is still in the conveyance path 238. The transfer sheet is then inverted by reversing the rotation of the inversion roller 245, and conveyed toward the discharge roller 244 side.

A discharge processing device 260 that aligns and binds transfer sheets discharged from the device 100 stacks and aligns, in a processing tray 264, the transfer sheets that are discharged one at a time. After some of the image formation has ended, the discharge processing device 260 staples a bundle of transfer sheets, and discharges the bundle into a discharge tray 262 or 263.

Upward and downward movement of the discharge tray 263 is controlled by a motor (not shown) such that the discharge tray 263 moves to the position of the processing tray 264 before the image formation operation begins, and then moves such that as discharged transfer sheets are stacked, the height of the top sheet is at the position of the processing tray 264. A tray lower limit sensor 268, which is for detecting the lower limit of the discharge tray 263, detects when approximately 2,000 transfer sheets are stacked in the discharge tray 263.

A sheet tray 261 stacks separation sheets that are inserted between discharged transfer sheets. A Z-folder 265 performs Z-folding on discharged transfer sheets. A bookbinding device 266 performs bookbinding by collectively center-folding and stapling a portion of discharged transfer sheets, and the bookbound bundle is discharged to a discharge tray 267.

Various types of sensors (not shown) are disposed at various places in the cross-sectional diagram of FIG. 2, and these sensors detect toner depletion, original jamming, remaining number of transfer sheets, transfer sheet jamming, remaining amount of development-related expendable members, original illumination lamp outage, and various other mechanical troubles. Besides event information indicating such trouble, the site monitoring apparatus 101 monitors the device 100 by collecting, via the network, status information that indicates the number of print output sheets, internally output logs, and the like.

Example of Configuration of Control Unit in Device

Figure 3:
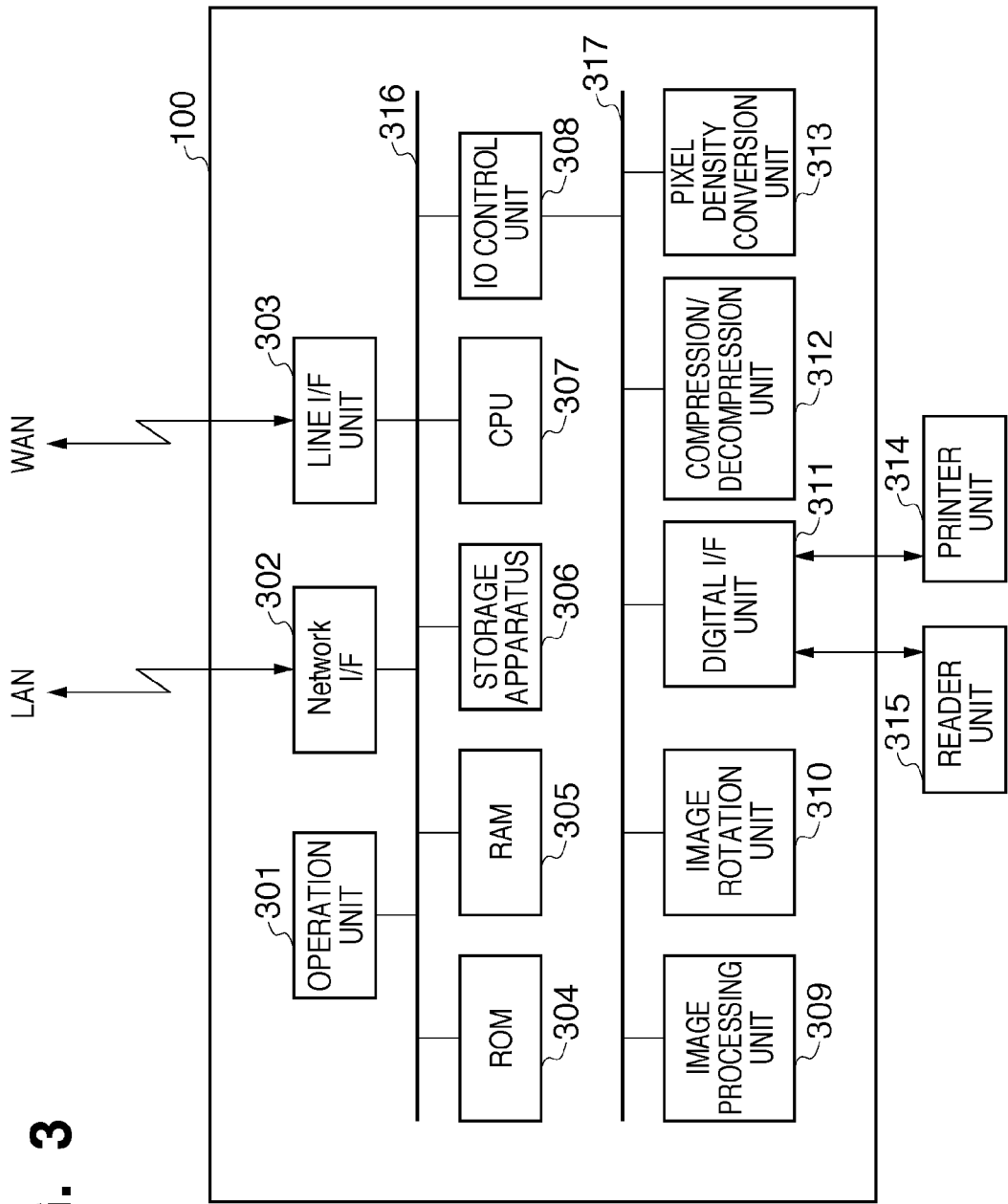
FIG. 3 is a block diagram showing a hardware configuration of a control unit in the device.

FIG. 3 is a block diagram showing a hardware configuration of a control unit in the device 100. This control unit performs processing for controlling programs such as mainly printing and scanning. The control unit also controls applications such as a device monitoring program. When transmitting device monitoring information with use of a service provided by the site monitoring apparatus 101, the control unit of the device 100 performs processing such as generating device monitoring information in a predetermined communication data format, and transmitting such data to the site monitoring apparatus 101.

The control unit includes an operation unit 301, a network I/F unit 302, a line I/F unit 303, a ROM 304, a RAM 305, a storage apparatus 306, and a CPU 307, which are the constituent elements of a portion for performing system management. Furthermore, the control unit includes an IO control unit 308, an image processing unit 309, a digital I/F unit 311, a compression/decompression unit 312, and a pixel density conversion unit 313, which are the constituent elements of a portion for performing image processing management. These constituent elements are connected by a system bus 316 and an image bus 317.

The ROM 304 stores a control program and a device monitoring program of the device 100, which are executed by the CPU 307. The RAM 305 is an image memory that includes a work area for the execution of programs, and is for temporarily storing image data and device status information necessary for the device monitoring program to perform monitoring. The storage apparatus 306 is a nonvolatile storage apparatus that stores various types of operating mode settings, a counter value, an operating log, and the like, which need to be held even after the device 100 has been restarted.

The network I/F unit 302 is an interface for connecting with a LAN, and performs communication with the site monitoring apparatus 101 via the LAN. The line I/F unit 303 is connected to an ISDN or a public telephone network, and is controlled by a communication control program in the ROM 304, and data is transmitted to and received from a remote terminal via this interface, a modem, and an NCU (network control unit). Facsimiles are also transmitted and received via the line I/F unit 303.

The operation unit 301 includes a display unit and a key input unit that are controlled by the CPU 307. Via the display unit and the key input unit, the operator gives instructions for performing various setting regarding scanner reading and print output, as well as giving instructions for starting and stopping operations.

The units described above are provided on the system bus 316. The IO control unit 308 is a bus bridge that connects the system bus 316 and the image bus 317 that transfers image data at high speed. The image bus 317 is configured by a PCI bus or IEEE 1394. The units described below are provided on the image bus 317. The digital I/F unit 311 connects the control unit and a reader unit 315 and a printer unit 314 of the device, and converts image data between a synchronous system and an asynchronous system. Also, information detected by the aforementioned sensors provided at various places in the reader unit 315 and the printer unit 314 is sent to the system bus 316 via the digital I/F unit 311 and the IO control unit 308.

The image processing unit 309 corrects, manipulates, and edits input and output image data. An image rotation unit 310 rotates image data. The compression/decompression unit 312 performs JPEG compression and decompression processing on multi-value image data, and performs JBIG/MMR/MR/MH compression and decompression processing on binary image data. The pixel density conversion unit 313 performs resolution conversion and the like on output image data.

Due to the CPU 307 executing control programs, operation information, trouble information, and the like in the storage apparatus 306 are read out and transmitted to the site monitoring apparatus 101 via the network I/F unit 302.

Example of Configuration of Control Unit in Site Monitoring Apparatus

FIG. 4 is a block diagram showing a hardware configuration of the site monitoring apparatus 101. The site monitoring apparatus 101 executes a program for device monitoring, collects operation information, trouble information, and the like from the device 100, manages the collected information as device monitoring information, and transmits the device monitoring information to the management server 105. The site monitoring apparatus 101 has a configuration including a general information processing apparatus (computer). Specifically, the site monitoring apparatus 101 includes a system bus 401, a CPU 402, a ROM 403, and a RAM 404, as well as a network I/F 405, a display control unit 406, a display device 409, an input control unit 407, input devices 410 and 411, and a storage apparatus 408.

The system bus 401 is a common signal path for transferring data between the parts that constitute the site monitoring apparatus 101. The RAM 404 is a rewritable memory that serves as a work area for the execution of a program that controls monitoring data acquired from the device 100 and data that is to be transmitted. Also, in the RAM 404, the information acquired from the device 100 is developed and converted into a predetermined data format. The storage apparatus 408 is a nonvolatile storage apparatus that stores an OS that performs hardware control, as well as an access program for acquiring a list of devices 100 that are to be monitored by the site monitoring apparatus 101 and information from the devices 100, and the like. Also similarly stored in the storage apparatus 408 are, for example, a resident program for receiving information from the device 100 and a transmission program for transmitting the acquired device monitoring information to the management server 105.

The network I/F 405 is an interface for connecting to a LAN, and performs communication with the device 100 and the management server 105 via the LAN. The CPU 402 individually or integrally controls the constituent elements 403 to 411, and collects device monitoring information from the device 100 via the network I/F 405 based on a program and a schedule stored in the storage apparatus 408.

The CPU 402 executes the program and provides a network service, and thus the site monitoring apparatus 101 receives device monitoring information that has been transmitted from the device 100. Also, by executing the transmission program on the received device monitoring information, the site monitoring apparatus 101 transmits the device monitoring information to the management server 105 via the network I/F 405.

Example of Software Configuration of Site Monitoring Apparatus

Figure 5:
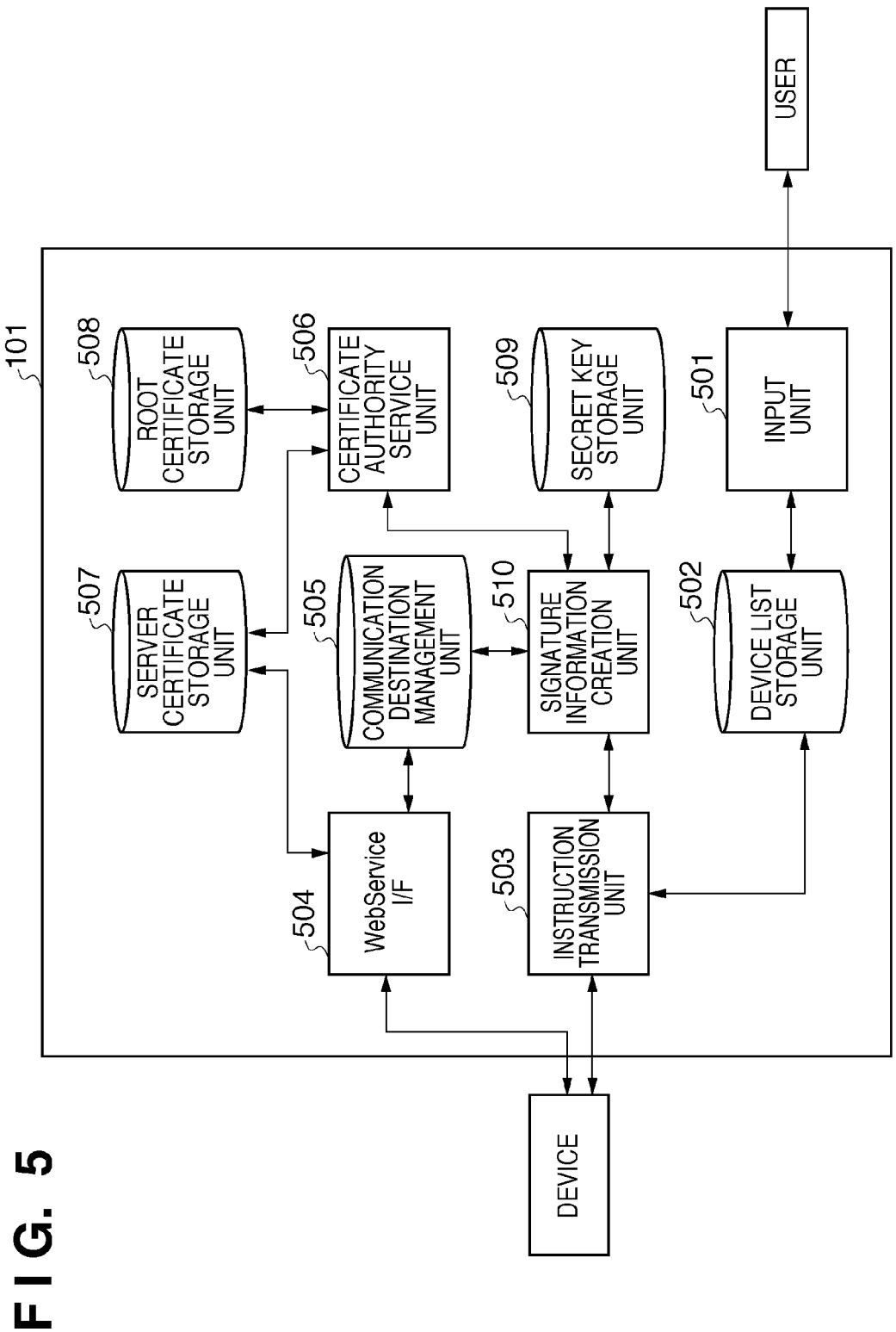
FIG. 5 is a block diagram showing functions of a setting application program in the site monitoring apparatus that instructs a change in communication destination information and securely performs data communication.

FIG. 5 is a block diagram showing functions of a setting application program in the site monitoring apparatus 101 that instructs a change to communication destination information and securely performs data communication. The application program has an input unit 501 that receives an input of a monitoring target device list for receiving, from the user, registration of monitoring target devices. The user inputs, to the input unit 501, information regarding one or more monitoring target devices. Here, the input unit 501 can receive an input of various types of setting information necessary for monitoring devices, such as an identifier for identifying a monitoring target device and product information. A device list storage unit 502 stores the various types of information regarding a monitoring target device that has been input to the input unit 501. Also, an instruction transmission unit 503 issues, to the monitoring target device registered in the device list storage unit 502, an instruction for making a supported function inquiry and an instruction for changing communication destination information. Upon receiving the result of the supported function inquiry made to the device and the result of other instructions given to the device, the device list storage unit 502 stores the results.

The site monitoring apparatus 101 provides a web service I/F 504 for receiving device monitoring information from the device. The web service I/F 504 can set network information (e.g., an IP address) and the port number of the site monitoring apparatus 101, and program information indicating a transmission destination for device monitoring information. Based on this setting information, the application program determines communication destination information (e.g., URL information) according to which the device 100 is to transmit device monitoring information. This communication destination information is stored in a communication destination management unit 505.

The device monitoring information transmitted from the device 100 is received by the web service I/F 504 provided by the site monitoring apparatus 101, and HTTPS communication is used here to perform secure communication. In order for HTTPS communication to be performed, the application program sets a server certificate in the web service I/F 504. However, a device such as the site monitoring apparatus that provides the web service I/F 504 on a consumer network cannot initially fix an address on the network. For this reason, it is difficult to use a general commercial electronic certificate authority service due to complicated procedures. In view of this, the site monitoring apparatus includes a certificate authority service unit 506 that issues a server certificate when the IP address of the site monitoring apparatus 101 has been specified. The issued server certificate is stored in a server certificate storage unit 507, and is set in the web service I/F 504. The certificate authority service unit 506 furthermore issues a root certificate with which the server certificate can be verified. The application program stores the root certificate in a root certificate storage unit 508.

In order to securely receive device monitoring information from the device 100, the communication destination information (URL information) of the device 100 needs to be changed by a trusted device. It is also necessary for the communication party to be authorized when the device 100 transmits device monitoring information. For this reason, the site monitoring apparatus 101 has a secret key with which signature information can be issued in order to certify that the site monitoring apparatus 101 is a trusted device, and the secret key is stored in a secret key storage unit 509. A signature information creation unit 510 acquires communication destination information (a URL) pertaining to the web service I/F 504 from the communication destination management unit 505, and furthermore acquires the root certificate from the root certificate storage unit 508 via the certificate authority service unit 506. Based on this communication destination information and root certificate information, the signature information creation unit 510 creates signature information with use of the secret key stored in the secret key storage unit 509.

An object of the present invention is to attach code that enables the data transmitter to be correctly authenticated. Accordingly, there is no need to use a digital signature created with use of a secret key, such as message authentication code, and there are no limitations on the information for authentication as long as the information enables performing authentication.

In the case of issuing a device monitoring information transmission instruction to a device in the monitoring target device list, the application program selects a target device from the device list storage unit 502. The application program then transmits the signature information generated by the signature information creation unit 510, the communication destination information, and the root certificate information via the instruction transmission unit 503.

Example of Software Configuration of Device

Figure 6:
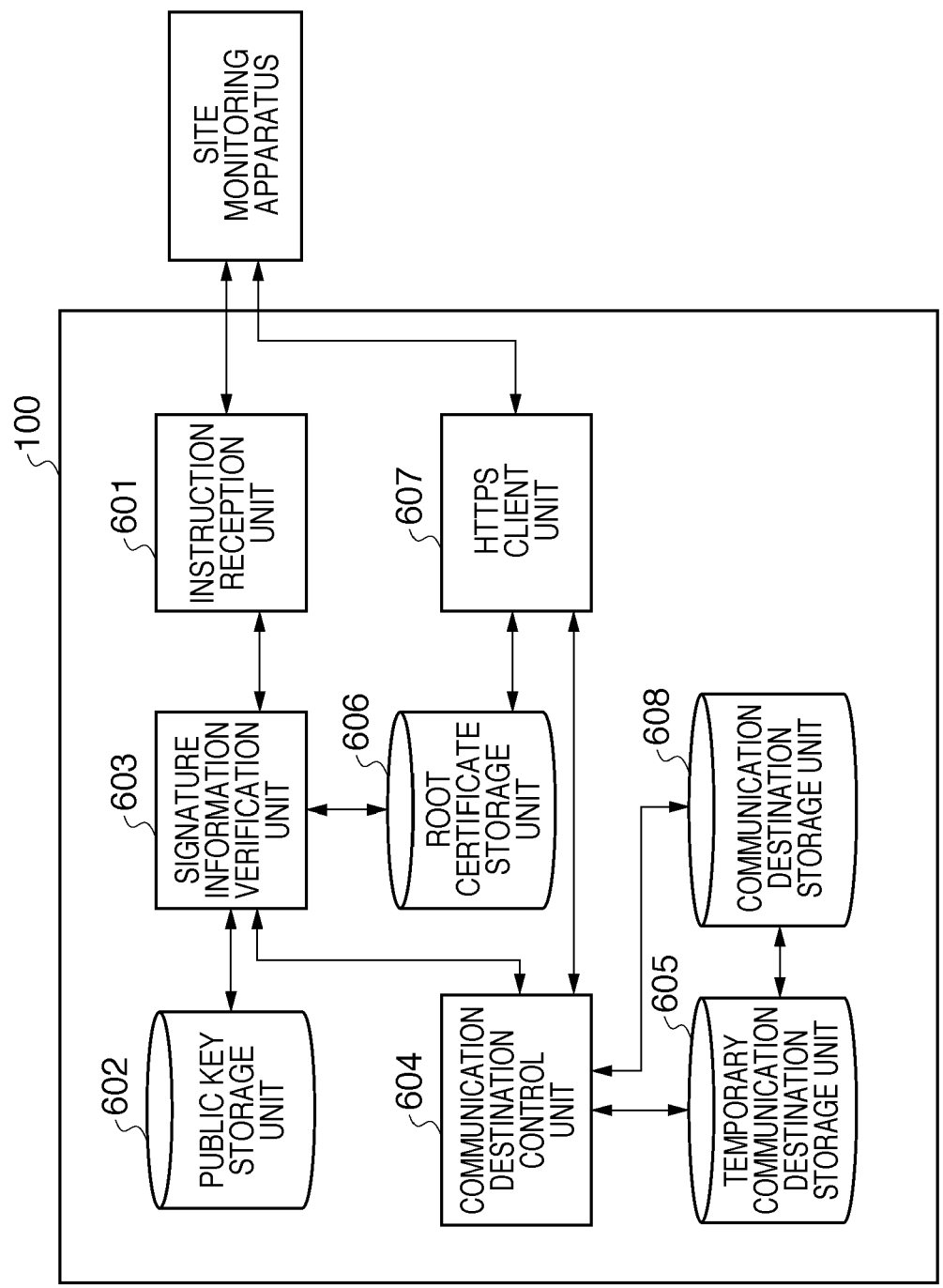
FIG. 6 is a block diagram showing functions of an application program in the device that changes the transmission destination of device monitoring information and performs setting regarding HTTPS communication with use of a root certificate.

FIG. 6 is a block diagram showing functions of an application program in the device 100 that changes the transmission destination for device monitoring information and performs setting regarding HTTPS communication performed with use of a root certificate. The application program has an instruction reception unit 601 that receives an instruction for changing communication destination information from the site monitoring apparatus 101. The instruction reception unit 601 receives a device product information inquiry, a supported function inquiry, the instruction for changing communication destination information from the site monitoring apparatus 101, and the like.

Here, the instruction for changing communication destination information that is received includes communication destination information, a root certificate, and digital signature information. Although the communication destination information and root certificate are transmitted at the same time in the present embodiment, such information may be transmitted at different times as long as the communication destination information and the root certificate can each be verified. In order to determine whether an instruction received via the network is an instruction from a trusted device, the device has a public key storage unit 602 that stores a public key. This public key is a key paired with the secret key stored by the site monitoring apparatus 101, and enables verification of the signature information. The device includes a signature information verification unit 603 that uses the public key to verify the signature information included in the instruction for changing communication destination information received by the instruction reception unit 601. After the instruction for changing communication destination information has been received, and furthermore the digital signature verification has ended, a communication destination control unit 604 performs control for temporarily storing the new communication destination information in a temporary communication destination storage unit 605. Also, the root certificate is stored in a root certificate storage unit 606.

The root certificate acquired by the device is for performing HTTPS communication with the site monitoring apparatus. After communication destination change processing has ended, and furthermore the root certificate has been set, an HTTPS client unit 607 of the device 100 performs a communication test with use of the communication destination information stored in the temporary communication destination storage unit 605. If the communication test has ended without any problems, the communication destination control unit 604 moves the communication destination information stored in the temporary communication destination storage unit 605 to a communication destination storage unit 608. This communication destination information is thereafter used as legitimate communication destination information for performing device monitoring. If the communication test has failed, the information in the temporary communication destination storage unit 605 is deleted, and the device is restored to the state from before reception of the instruction for changing communication destination information. Due to storing the previous communication destination information in this way, even if processing performed in accordance with the instruction for changing communication destination information is not successful, the device can be monitored in the same way as before the change instruction was received, by again using the previous communication destination information.

Example of Communication Data Transmitted by Site Monitoring Apparatus of Present Embodiment FIG. 7 is a diagram schematically showing communication data by which the site monitoring apparatus 101 sends an instruction for changing communication destination information, and sends a root certificate for communication. The data structure in this figure is shown schematically, and in actuality the communication data 701 is described in XML format and furthermore transmitted to the device 100 via an encryption protocol such as HTTPS communication. Also, the communication data 701 indicates an instruction for changing communication destination information. A method name is described in the data, and "setComSetting" indicates an instruction for changing communication destination information. Also, serialNumber 702 indicates an identifier of a monitoring target device, which is the serial number of the device. This data explicitly indicates that the site monitoring apparatus 101 is issuing a communication change instruction to a specific device. Furthermore, webServiceUrl 703 is the communication destination information (URL information) of the web service provided by the site monitoring apparatus 101. At the time of initial setting, the transmission destination for device monitoring information of the device 100 is set such that the device monitoring information is transmitted directly to a management server on the Internet. Here, webServiceUrl 703 indicates the transmission destination URL for changing the transmission destination URL for device monitoring information from the management server to the site monitoring apparatus. Also, processType 704 indicates the type of processing instruction that is issued to the device 100. Via processType 704, the site monitoring apparatus 101 designates one of various processing patterns that have been prescribed in advance, such as performing only processing for changing communication destination information, performing root certificate setting, or performing normal transmission of device monitoring information. Moreover, enable 705 indicates an instruction for enabling or disabling a device monitoring function. Furthermore, certInfo 706 indicates information obtained by encoding a root certificate. The site monitoring apparatus 101 encodes the root certificate with use of an encoding processing method such as base64, and outputs the resulting data as the root certificate. Lastly, signature 707 indicates signature information for indicating whether the communication data is data that has been issued from the correct site monitoring apparatus 101.

Example of Operations of Site Monitoring Apparatus of Present Embodiment

Figure 8:
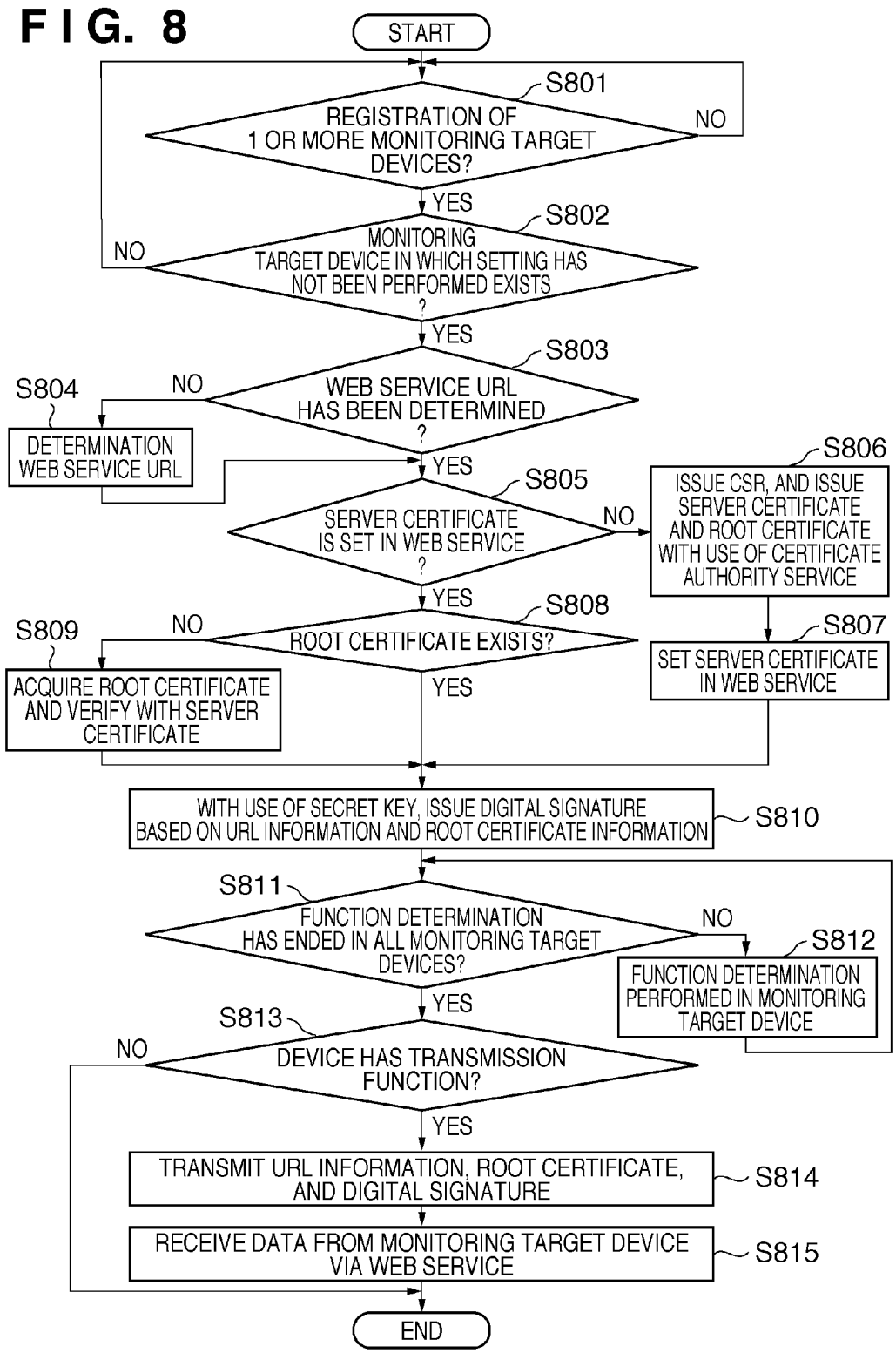
FIG. 8 is a flowchart showing processing performed by the site monitoring apparatus from receiving registration of a monitoring target device list to receiving device monitoring information from devices.

Next is a description of an example of operations performed by the site monitoring apparatus 101 of the present embodiment with reference to FIG. 8. The flowchart in FIG. 8 shows processing in which the site monitoring apparatus 101 receives registration of a monitoring target device list and receives device monitoring information from devices 100. This flowchart includes processing for, for example, transmitting communication destination information (here, URL information) of the site monitoring apparatus 101, a root certificate, and appended signature information. Such processing is stored in the ROM 403, the RAM 404, or the storage apparatus 408 shown in FIG. 4, and is executed by the CPU 402.

Firstly, in S801 and S802, one or more monitoring target devices are registered, and if a monitoring target device in which setting has not been performed exists, the procedure proceeds to S803 in which a determination is made as to whether the URL of the web service provided by the site monitoring apparatus 101 has been determined. If the web service has started, the URL has already been determined.

If the communication destination information has not been determined, the procedure proceeds to S804 in which the URL of the web service is determined. As the flow of URL determination processing, the user performs setting regarding the web service of the site monitoring apparatus 101, and starts the provision of the service. Accordingly, the CPU 402 determines the URL information of the web service based on network address information, port information, and program path information of the site monitoring apparatus 101. After the URL has been determined in S804, or if it has been determined in S803 that the URL has already been determined, the procedure proceeds to S805 in which the CPU 402 checks whether a server certificate has been set in the web service. If it has been determined in S805 that a server certificate has not been set in the web service, the procedure proceeds to S806 in which the CPU 402 issues a certificate signing request (CSR). Furthermore, a server certificate and a root certificate are issued by the certificate authority service based on the CSR. Next, in S807 the CPU 402 sets the server certificate in the web service.

On the other hand, if it has been determined in S805 that a server certificate is set in the web service, the procedure proceeds to S808 in which a determination is made as to whether a root certificate corresponding to the server certificate already set in the web service exists in the application. If a corresponding root certificate does not exist, the procedure proceeds to S809 in which a root certificate is acquired from the user through a UI of the application or the like, and whether the server certificate can be verified with the acquired root certificate is checked. The procedure then proceeds to S810. If it has been determined in S808 that a corresponding root certificate already exists, the procedure proceeds to S810. In S810, digital signature information is generated based on the URL information and the root certificate information with use of the secret key managed in the site monitoring apparatus, and the digital signature information is issued.

In S811, the CPU 402 checks whether the determination regarding the functions of the registered monitoring target devices has ended. This function determination is processing for determining whether a monitoring target device has a function for transmitting device monitoring information. If the determination has not been completed for a device, the procedure proceeds to S812 in which the monitoring target device function determination processing is performed.

After the function determination (S812) processing has ended for all of the devices, in S813 whether each device includes the transmission function is checked based on the result of the function determination processing. Here, if a device among the monitoring target devices has a transmission function, and setting for that device has not ended, the procedure proceeds to S814 in which the URL information, the root certificate information, and the digital signature are transmitted to the device 100. The data that is transmitted at this time is the transmission data shown in FIG. 7. After this information has been transmitted to the monitoring target device, in S815 data transmitted from the monitoring target device is received via the web service. Accordingly, the monitoring of the device is started. If a determination has been made in S813 that none of the monitoring target devices has the transmission function, or if setting has been performed in all of the devices having the transmission function, the setting processing ends.

Although the URL change instruction can be issued to the devices 100 that have the transmission function after the device determination process has been performed in S811, there can be cases in which the site monitoring apparatus 101 performs setting in several thousands of devices. In such a case, setting processing would take too long if function determination processing and URL change setting processing are performed consecutively for each device, and therefore it is impossible to immediately determine whether device registration processing has been successful or failed. For this reason, in this processing, the function determination processing and URL setting processing are performed separately. Accordingly, the result of the determination processing, which is obtained relatively quickly, is displayed to the service person performing operations on a UI, thus relieving the burden on the service person during device registration.

Example of Operations of Device of Present Embodiment

FIG. 9 is a flowchart showing processing in which the device 100 of the present embodiment receives a function confirmation request and transmits device monitoring information. The processing shown in this flowchart includes, for example, processing in which the device 100 receives communication destination information (here, URL information), a root certificate, and signature information, and performs communication for starting monitoring. Such processing is stored in the ROM 304, the RAM 305, or the storage apparatus 306 shown in FIG. 3, and is executed by the CPU 307.

Firstly, in S901 the CPU 307 receives a function confirmation request from the site monitoring apparatus 101. This is processing corresponding to S812 (FIG. 8), and the request is an inquiry as to whether the device 100 has a function for transmitting device monitoring information. If this inquiry has been received, the procedure proceeds to S902 in which the CPU 307 transmits a function confirmation response. However, if a function confirmation request has not been received, the procedure proceeds to S903 in which the CPU 307 determines whether URL information, a root certificate, and digital signature information have been received from the site monitoring apparatus 101. The procedure returns to S901 if such information has not been received, and proceeds to S904 if such information has been received.

In S904, the CPU 307 performs digital signature information verification (authentication processing) with use of the public key managed by the device. If the result of the verification in S905 is that the digital signature was successfully authenticated, the procedure proceeds to S906. If the authentication has failed, the procedure proceeds to S912 in which the received data is discarded, and thereafter the procedure proceeds to S913.

In S906, the acquired URL information is stored in the temporary communication destination storage unit 605. Then, in S907 a communication test is performed with use of the URL information stored in the temporary communication destination storage unit 605. Here, for example, the communication destination URL for device monitoring data in the device 100 is switched from the original URL of the management server on the Internet to the URL of the site monitoring apparatus 101 included in the instruction. The root certificate is stored in a storage location that can be accessed by HTTPS communication, and an HTTPS communication test is executed with use of the root certificate.

Next, in S908 a determination is made as to whether the communication test was successful. The procedure proceeds to S911 if the result of the determination was not successful. In S911, the URL information is deleted from the temporary communication destination storage unit 605, and the received root certificate is discarded, and thereafter the procedure proceeds to S913.

On the other hand, if it has been determined in S908 that the communication test was successful, the procedure proceeds to S909 in which the URL information in the temporary communication destination storage unit 605 is moved to the communication destination storage unit 608 and thus used as the legitimate communication destination. Next, in S910 the actual device monitoring data is transmitted to the site monitoring apparatus, and thereafter this processing ends. In S913, the device reverts to the state from before the reception of the instruction for changing the communication destination, and thereafter this processing ends.

Example of Sequence of Communication Between Site Monitoring Apparatus and Device of Present Embodiment FIG. 10 is a diagram schematically showing a sequence of communication and internal processing from when the site monitoring apparatus 101 sends a root certificate and an instruction for changing communication destination information, until when the device 100 enters a monitored state. Firstly, the site monitoring apparatus 101 transmits a URL change instruction and a root certificate to the device 100 (1001). The content that is transmitted is the information indicated by the communication data shown in FIG. 7. Upon receiving the instruction, the device 100 transmits a response (OK) (1002). Thereafter, the device 100 that received the instruction performs digital signature verification (1003). Here, the device verifies that the instruction is from a trusted device, and thereafter changes the communication URL (1004). Root certificate setting is then performed (1005).

After this setting processing has ended, the device 100 issues a communication destination confirmation method to the site monitoring apparatus 101 (1006). Here, at the same time as verifying the server certificate of the site monitoring apparatus 101 with use of the received root certificate, the device checks whether the communication destination address is a trusted server. The device 100 checks whether the communication destination address is a trusted server based on whether the site monitoring apparatus 101 is in possession of the secret key. Accordingly, the device 100 issues an arbitrary random number with use of the communication destination confirmation method, and transmits it to the site monitoring apparatus 101. Upon receiving the random number, the site monitoring apparatus 101 uses the secret key to issue digital signature information with respect to the received random number, and transmits the digital signature information to the device 100 as a response (1007). Based on the issued random number and the received digital signature information, the device 100 determines whether the digital signature is correct with use of the public key (1008).

If the site monitoring apparatus 101 has been determined to be a trusted server, the device 100 performs a communication test, which is initial communication for entering the monitored device state (1009). The device 100 then receives a response from the site monitoring apparatus 101 (1010), and if this series of processing is successful, secure HTTPS communication will be able to be performed. Note that if a problem is found in the digital signature or another problem occurs in the above processing for changing communication destination information, the device 100 reverts to the state from before receiving the instruction for changing communication destination information.

Also, if the above-described communication test was successful, the site monitoring apparatus 101 adjusts the setting information of the device 100 before starting normal device monitoring. If the communication test was successful, the device 100 transmits a command inquiry to the site monitoring apparatus 101 (1011). Upon receiving the command inquiry, the site monitoring apparatus 101 transmits a request for issuing a setting acquisition method (1012).

Next, upon receiving the setting acquisition method request, the device 100 issues a setting acquisition method (1013). Upon receiving the setting acquisition method, the site monitoring apparatus 101 transmits part or all of the monitoring setting information set in the site monitoring apparatus 101 to the device 100 (1014). At this time, the site monitoring apparatus 101 transmits appropriate setting information according to the type of the device 100 and the functions thereof. Upon receiving the setting information from the site monitoring apparatus 101, the device 100 internally stores the setting information, and such information is used as setting information for performing device monitoring (1015).

Example of Timing of Site Monitoring Apparatus Confirmation Performed by Device of Present Embodiment Thereafter, the device 100 continues to transmit device monitoring information to the site monitoring apparatus 101, but if the environment of the device 100 changes due to the device 100 being moved or the like, there is the possibility of transmitting data to a non-trusted server. Also, if a malicious third party has replaced the communication destination server with another server, there is the possibility of data being stolen.

For this reason, the device 100 issues a communication destination confirmation method at specific timings in order to confirm whether the server at the communication destination address is a trusted server (1006). Firstly, the device 100 confirms communication with the communication destination address at a first timing, which is after reception of the communication destination address change request as described in the communication sequence example. Next, communication with the communication destination address is confirmed periodically (e.g., twice a day) at timings that do not interfere with device monitoring. Lastly, communication with the communication destination address is checked after the power of the device has been turned on.

Performing the above communication confirmation enables the site monitoring apparatus 101 to securely and continuously collect device monitoring data from the device 100.

If, based on the digital signature, the communication destination address has been determined to not be a trusted communication destination at any of the timings described above, the transmission of device monitoring information is immediately stopped, thus preventing the leakage of data. Also, even if a monitored device has determined that the communication destination address is not a trusted communication destination, the device continues to perform processing for confirming the communication destination at the specific timings. Accordingly, the device 100 can automatically return to the monitored state if the environment of the device 100 has been restored.

The present embodiment enables a communication destination address to be securely changed, and enables device monitoring to be performed in a secure communication environment.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-267829, filed Nov. 25, 2009 and 2010-110597, filed May 12, 2010, which are hereby incorporated by reference herein in their entirety.

What is claimed is:

1. A device management system including a site monitoring apparatus that communicates with a management server via an internet, and a plurality of monitoring target devices that are to be connected to the site monitoring apparatus,
wherein the site monitoring apparatus comprises at least one processor functioning as:
a holding unit that holds a secret key that is paired with a public key held by each of the monitoring target devices;
an issue unit that issues, within the site monitoring apparatus, a server certificate and a root certificate that are for performing secure communication with each of the monitoring target devices;
a signature unit that issues, with use of the secret key, a digital signature based on communication destination information in which the site monitoring apparatus is a communication destination and the root certificate issued by the issue unit; and
a transmission unit that transmits the communication destination information, the root certificate issued by the issue unit, and the digital signature issued by the signature unit to each of the monitoring target devices, and
wherein each of the monitoring target devices comprises at least one processor functioning as:
a holding unit that holds the public key paired with the secret key held by the site monitoring apparatus;
a reception unit that receives the communication destination information, the root certificate, and the digital signature from the site monitoring apparatus;
an authentication unit that performs authentication on the digital signature received by the reception unit with use of the public key; and
a communication unit that, in the case of successful authentication performed by the authentication unit, changes a communication destination for device monitoring information from the management server to the site monitoring apparatus and performs secure communication with the site monitoring apparatus, with use of the communication destination information and the root certificate received by the reception unit;
wherein the communication destination information is URL information,
wherein the processor of the site monitoring apparatus further functions as a confirmation unit that inquires whether each of the monitoring target devices has a transmission function for transmitting device monitoring information by a web service with use of the URL information,
wherein the transmission unit transmits the communication destination information, the root certificate, and the digital signature to the monitoring target devices that have been confirmed as having the transmission function by the inquiry performed by the confirmation unit, and
wherein the transmission unit does not transmit the communication destination information, the root certificate, and the digital signature to the monitoring target devices that have been confirmed as not having the transmission function by the inquiry performed by the confirmation unit.

2. The system according to claim 1, wherein the at least one processor in each of the monitoring target devices further functions a reversion unit that, if the authentication performed by the authentication unit has failed, or if the communication performed by the communication unit has failed, discards the communication destination information received by the reception unit, and reverts the communication destination for device monitoring information to the management server.

3. A device management method performed in a device management system including a site monitoring apparatus that communicates with a management server via an internet, and a plurality of monitoring target devices that are to be connected to the site monitoring apparatus,
wherein the site monitoring apparatus executes:
a holding step of holding a secret key that is paired with a public key held by each of the monitoring target devices;
an issue step of issuing, within the site monitoring apparatus, a server certificate and a root certificate that are for performing secure communication with each of the monitoring target devices;
a signature step of issuing, with use of the secret key, a digital signature based on communication destination information in which the site monitoring apparatus is a communication destination and the root certificate issued in the issue step; and
a transmission step of transmitting the communication destination information, the root certificate issued in the issue step, and the digital signature issued in the signature step to each of the monitoring target devices, and
wherein each of the monitoring target devices executes:
a holding step of holding the public key paired with the secret key held by the site monitoring apparatus;
a reception step of receiving the communication destination information, the root certificate, and the digital signature from the site monitoring apparatus;
an authentication step of performing authentication on the digital signature received in the reception step with use of the public key; and
a communication step of, in the case of successful authentication performed in the authentication step, changing a communication destination for device monitoring information from the management server to the site monitoring apparatus and performing secure communication with the site monitoring apparatus, with use of the communication destination information and the root certificate that were received in the reception step;

wherein the communication destination information is URL information, wherein the site monitoring apparatus further performs a confirmation step that inquires whether each of the monitoring target devices has a transmission function for transmitting device monitoring information by a web service with use of the URL information, wherein the transmission step transmits the communication destination information, the root certificate, and the digital signature to the monitoring target devices that have been confirmed as having the transmission function by the inquiry performed in the confirmation step, and wherein the transmission step does not transmit the communication destination information, the root certificate, and the digital signature to the monitoring target devices that have been confirmed as not having the transmission function by the inquiry performed in the confirmation step.

4. A site monitoring apparatus that communicates with a management server via an internet and is configured to be connected to a monitoring target device, said apparatus comprising at least one processor functioning as:

a holding unit that holds a secret key that is paired with a public key held by the monitoring target device;

an issue unit that issues, within the site monitoring apparatus, a server certificate and a root certificate that are for performing secure communication with the monitoring target device;

a signature unit that issues, with use of the secret key, a digital signature based on communication destination information in which the site monitoring apparatus is a communication destination and the root certificate issued by the issue unit;

a transmission unit that transmits the communication destination information, the root certificate issued by the issue unit, and the digital signature issued by the signature unit to the monitoring target device, wherein the communication destination information is transmitted for changing the communication destination for device monitoring information from the management server to the site monitoring apparatus; and a communication unit that performs secure communication with the monitoring target device depending on a communication test performed by the monitoring target device with use of the communication destination information and the root certificate in the case of successful authentication of the digital signature performed with use of the public key held by the monitoring target device, wherein the device monitoring information is acquired from the monitoring target device with use of the communication performed by the communication unit;

wherein the communication destination information is URL information, wherein the processor further functions as a confirmation unit that inquires whether the monitoring target device has a transmission function for transmitting device monitoring information by a web service with use of the URL information, wherein the transmission unit transmits the communication destination information, the root certificate, and the digital signature to the monitoring target device that has been confirmed as having the transmission function by the inquiry performed by the confirmation unit, and wherein the transmission unit does not transmit the communication destination information, the root certificate, and the digital signature to the monitoring target device that has been confirmed as not having the transmission function by the inquiry performed by the confirmation unit.

5. The apparatus according to claim 4, wherein the monitoring target device is an image forming apparatus, and
the device monitoring information includes operation information and trouble information relating to the image forming apparatus.

6. The apparatus according to claim 4, wherein the transmission unit further transmits an instruction for enabling a device monitoring function.

7. The apparatus according to claim 4, wherein the URL information is determined based on network address information, port information, and program path information of the site monitoring apparatus.

8. A site monitoring method performed by a site monitoring apparatus that communicates with a management server via an internet and is configured to be connected to a monitoring target device, comprising:

a holding step of holding a secret key that is paired with a public key held by the monitoring target device;

an issue step of issuing, within the site monitoring apparatus, a server certificate and a root certificate that are for performing secure communication with the monitoring target device;

a signature step of issuing, with use of the secret key, a digital signature based on communication destination information in which the site monitoring apparatus is a communication destination and the root certificate issued in the issue step;

a transmission step of transmitting the communication destination information, the root certificate issued in the issue step, and the digital signature issued in the signature step to the monitoring target device, wherein the communication destination information is transmitted for changing the communication destination for device monitoring information from the management server to the site monitoring apparatus; and a communication step of performing secure communication with the monitoring target device depending on a communication test performed by the monitoring target device with use of the communication destination information and the root certificate in the case of successful authentication of the digital signature performed with use of the public key held by the monitoring target device, wherein the device monitoring information is acquired from the monitoring target device with use of the communication performed in the communication step, wherein the communication destination information is URL information, wherein the site monitoring apparatus further performs a confirmation step that inquires whether the monitoring target device has a transmission function for transmitting device monitoring information by a web service with use of the URL information, wherein the transmission step transmits the communication destination information, the root certificate, and the digital signature to the monitoring target device that has been confirmed as having the transmission function by the inquiry performed in the confirmation step, and wherein the transmission step does not transmit the communication destination information, the root certificate, and the digital signature to the monitoring target device that has been confirmed as not having the transmission function by the inquiry performed in the confirmation step.

9. A non-transitory computer readable storage medium on which is stored a computer program for making a computer execute a method for a site monitoring apparatus that communicates with a management server via an internet and is configured to be connected to a monitoring target device, the method comprising the steps of:

a holding step of holding a secret key that is paired with a public key held by the monitoring target device;

an issue step of issuing, within the site monitoring apparatus, a server certificate and a root certificate that are for performing secure communication with the monitoring target device;

a signature step of issuing, with use of the secret key, a digital signature based on communication destination information in which the site monitoring apparatus is a communication destination and the root certificate issued in the issue step;

a transmission step of transmitting the communication destination information, the root certificate issued in the issue step, and the digital signature issued in the signature step to the monitoring target device, wherein the communication destination information is transmitted for changing the communication destination for device monitoring information from the management server to the site monitoring apparatus; and a communication step of performing secure communication with the monitoring target device depending on a communication test performed by the monitoring target device with use of the communication destination information and the root certificate in the case of successful authentication of the digital signature performed with use of the public key held by the monitoring target device, wherein the device monitoring information is acquired from the monitoring target device with use of the communication performed in the communication step, wherein the communication destination information is URL information, wherein the site monitoring apparatus further performs a confirmation step that inquires whether the monitoring target device has a transmission function for transmitting device monitoring information by a web service with use of the URL information, wherein the transmission step transmits the communication destination information, the root certificate, and the digital signature to the monitoring target device that has been confirmed as having the transmission function by the inquiry performed in the confirmation step, and wherein the transmission step does not transmit the communication destination information, the root certificate, and the digital signature to the monitoring target device that has been confirmed as not having the transmission function by the inquiry performed in the confirmation step.

* * * * *